United States Patent [19]

Kageyama

[11] Patent Number: 5,370,950

[45] Date of Patent: Dec. 6, 1994

[54] NON-AQUEOUS ELECTROLYTE SECONDARY BATTERY

[75] Inventor: Masayuki Kageyama, Fukushima, Japan

[73] Assignee: Sony Corporation, Tokyo, Japan

[21] Appl. No.: 872,123

[22] Filed: Apr. 22, 1992

[30] Foreign Application Priority Data

May 2, 1991 [JP] Japan ................... 3-130691

[51] Int. Cl.$^5$ .............................. H01M 4/36
[52] U.S. Cl. .................... 429/232; 429/197; 429/235; 429/245
[58] Field of Search ............. 429/232, 197, 235, 245, 429/194

[56] References Cited

U.S. PATENT DOCUMENTS 3,892,589  7/1975  Rosansky et al. .................. 429/188
4,615,959 10/1986  Hayashi et al. .................... 429/194
4,980,250 12/1990  Takahashi et al. .................. 429/194

Primary Examiner—Prince Willis, Jr.
Assistant Examiner—M. Nuzzolillo
Attorney, Agent, or Firm—Hill, Steadman & Simpson

[57] ABSTRACT

There is disclosed a non-aqueous electrolyte secondary battery comprising a cathode can, a cathode pellet, a separator, an anode can, an anode pellet, and a non-aqueous electrolytic solution. At the portion in contact with the cathode can of the cathode pellet and the portion in contact with the anode can of the anode pellet, layers containing powder having conductive property are respectively formed. The powder having conductive property is aluminum powder on the cathode side and is copper powder on the anode side. The layers containing powder having conductive property are integrally molded as the result of the fact that they are compression-molded along with a cathode active material and an anode active material.

3 Claims, 2 Drawing Sheets

NON-AQUEOUS ELECTROLYTE SECONDARY BATTERY

BACKGROUND OF THE INVENTION

1. Field of the Invention

This invention relates to a non-aqueous electrolyte secondary battery, and more particularly to a non-aqueous electrolyte secondary battery of the coin type.

2. Description of the Related Art

In electronic equipments subject to carrying, e.g., an electronic calculator or an electronic wrist watch, etc., in order to allow the entirety of the device to be as compact as possible in dimension, a battery serving as a power supply is also required to be as small as possible in dimension and to be light in weight, and to have a sufficient discharge capacity tolerable for long use. As a power supply for such electronic equipments, so called a coin type non-aqueous electrolyte battery comprising a cathode can, a cathode pellet, a separator, an anode pellet, and an anode can stacked in order recited has been conventionally used.

Meanwhile, a coin type non-aqueous electrolyte battery as described above ordinarily has a primary battery specification. However, in recent years, since such a coin type non-aqueous electrolyte battery is being used as an electronic wrist watch or various memory backup power supplies for which long time of 5 to 10 years use is required, it has been required in various fields to proceed with a development of a rechargeable secondary battery specification in order that such a coin type non-aqueous electrolyte battery can be economically used for a long time.

As a battery to meet with such a requirement, the spotlight of attention is focused on a lithium secondary battery using lithium as the anode. However, up to the present, it cannot be said that this lithium secondary battery is at a practically acceptable level. Namely, lithium is crystal-grown in the form of dendrite with repetition of charge/discharge cycle, and is passed through holes of the separator or gaps of the fiber to reach the cathode, resulting in the drawback that an internal short-circuit takes place, or lithium is inactivated and is separated out or precipitated in the form of powder. This is an obstruction to practical use.

In view of this, as a battery to solve the drawbacks with a battery using lithium as the anode, a coin type non-aqueous electrolyte secondary battery using, as the anode material, carbon material capable of doping/undoping lithium or lithium ion, such as coke, graphite, or organic high molecular burned body, etc., has been proposed. Great expectations are laid on this coin-type non-aqueous electrolyte secondary battery because there is no occurrence of lithium dendrite due to repetition of charge/discharge cycle, the battery voltage is high, and a high energy density can be obtained.

As stated above, various coin-type non-aqueous electrolyte secondary batteries have been proposed from now. However, conventional coin-type non-aqueous electrolyte secondary batteries have a tendency such that the internal resistance is high from a structural restriction. Especially, if a volume change of the cathode pellet or the anode pellet takes place by repeating charge/discharge cycle when used under a heavy load or when used at a high temperature, rise in the internal resistance is remarkable. For this reason, it is the present circumstances that it cannot be said that conventional coin-type non-aqueous electrolyte secondary batteries are not sufficiently satisfactory in the heavy load characteristic and the high temperature characteristic.

OBJECT AND SUMMARY OF THE INVENTION

With the above in view, an object of this invention is to provide a non-aqueous electrolyte secondary battery having a low internal resistance and excellent in the heavy load characteristic and the high temperature characteristic.

As the result of the fact that the inventors have repeatedly conducted various studies on the internal resistance of the coin-type non-aqueous electrolyte secondary battery, they found out that the fact that electric contacts between the cathode can and the cathode pellet and between the anode can and the anode pellet are insufficient constitutes one cause to increase the internal resistance. The inventors come to the conclusion that the heavy load characteristic and the high temperature characteristic can be improved by allowing electrical contacts at these portions to be good.

This invention has been proposed on the basis of such a finding. Namely, there is provided a non-aqueous electrolyte secondary battery comprised of a cathode can, a cathode pellet, a separator, an anode pellet, and an anode can characterized in that layers containing powder or fine particle having conductive property are integrally formed at the portion in contact with the cathode can of the cathode pellet and the portion in contact with the anode can of the anode pellet, respectively.

In the non-aqueous electrolyte secondary battery comprising a cathode can, a cathode pellet, a separator, an anode pellet, and an anode can stacked in order recided, when layers containing powder having conductive property are respectively formed at the portion in contact with the cathode can of the cathode pellet and the portion in contact with the anode can of the anode pellet, the layers containing powder function as a collector, so the electrical contacts between the cathode pellet the cathode can and between the anode pellet and the anode can become good. Thus, the heavy load characteristic and the high temperature characteristic become satisfactory.

In this invention since powder or fine particles having a conductive property as a collector are respectively interposed between the cathode can and the cathode pellet and between the anode can and the anode pellet in such a form that they are integrally molded with the cathode and anode pellets, layers containing such powder function as a collector. As a result, the electric contacts between the cathode can and the cathode pellet and between the anode can and the anode pellet inside the battery can become satisfactory. Accordingly, it is possible to provide a coin-type non-aqueous electrolyte secondary battery having a large electric capacity, having less degradation of discharge capacity when charge/discharge cycle is repeated, and excellent in the heavy load characteristic and the high temperature characteristic. Thus, the industrial value is great.

DETAILED DESCRIPTION OF THE INVENTION

Figure 1:
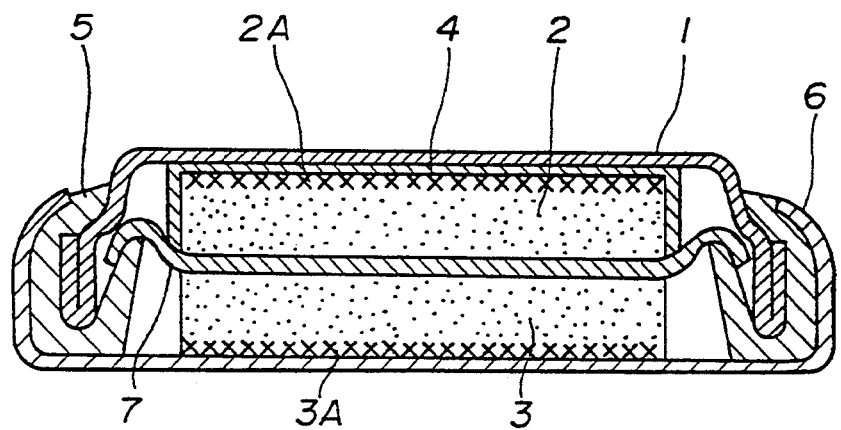
FIG. 1 is a cross sectional view showing an example of a coin-type non-aqueous electrolyte secondary battery to which this invention is applied.

A non-aqueous electrolyte secondary battery of this invention is constructed as shown in FIG. 1, for example. Namely, a cathode pellet 3 and an anode pellet 2 are arranged through a separator 7. The structure thus obtained are accommodated within a cathode can 6 and an anode can 1, and sealing is implemented thereto through a gasket. Accordingly, the cathode pellet 3 is in contact with the cathode can 6, and the anode pellet 2 is in contact with the anode can 1 through an anode ring. The cathode can 6 and the anode can 1 function as electrodes, respectively.

As a cathode active material constituting the cathode pellet 3, there may be used oxide of transition metals such as $LiCoO_2$, manganese dioxide, vanadium pentoxide, or iron sulfide; chalcogen compound; oxide of these materials; composite compound of chalcogen compound and lithium. The cathode pellet can be provided, e.g., by compression-molding a mixture of any one of these cathode active materials, graphite powder and PTFE powder.

On the other hand, as an anode active material constituting the anode pellet 2, there are enumerated carbon material capable of doping/undoping lithium ion, e.g., pyrolitic carbon, coke (pitch coke, petroleum coke, or coal coke, etc.), carbon black (acetylene black, etc.), carbon in the form of glass, organic high molecular material burned body (organic high molecular material burned in an inactive gas flow or in vacuum at a suitable temperature more than 500° C.), and carbon fiber, etc.

In the non-aqueous electrolyte secondary battery of this invention, in order to reduce the internal resistance of the battery, layers 3A and 2A containing powder having conductive property are formed at the cathode pellet 3 and the anode pellet 2, respectively.

These layers 3A and 2A are respectively formed at the portion in contact with the cathode can 6 of the cathode pellet 3 and the portion in contact with the anode can 1 of the anode pellet 2, and are integrally molded by compression-molding powder having conductive property along with cathode active material and the anode active material.

As the powder having conductive property contained in the layer 3A formed on the cathode pellet 3, there may be used aluminum, titanium, nickel, platinum, tantalum, or alloy such as stainless, or inconel, graphite, carbon, or conductive high molecule, etc.

On the other hand, as the powder having conductive property contained in the layer 2A of the anode pellet 2, there may be used copper, titanium, nickel, platinum, tantalum, or allow such as stainless or inconel, etc.

Anyway, as the powder having conductivity, it is preferable to select a material which does not alloy lithium, etc., or does not corrode.

Further, it is preferable that the filling area occupied by conductive powder in the cathode pellet and the anode pellet is more than one half of areas in which the cathode pellet and the anode pellet are respectively in contact with the cathode can and the anode can.

For the above-described non-aqueous electrolyte secondary battery, an electrolytic solution is required. As this electrolytic solution, there is used, e.g., an electrolytic solution in which lithium salt as electrolyte is dissolved in an organic solvent. Here, as the organic solvent, although specifically limited, there may be used, e.g., a solvent including any one of propylene carbonate, ethylene carbonate, diethyl carbonate, 1,2-dimethoxyethane, 1,2-diethoxyethane, γ-butyrolactone, tetrahydrofuran, 1,3-dioxolan, 4-methyl-1, 3-dioxolan, diethyl ether, sulfolan, methyl sulfolan, acetonitrile, propionitrile, etc., or a mixed solvent including two kinds of the above materials or more. As the electrolyte, any material known heretofore may be used. For example, there are $LiClO_4$, $LiAsF_6$, $LiPF_6$, $LiBF_4$, $LiB(C_6H_5)_4$, $LiCl$, $LiBr$, $CH_3SO_3Li$, $CF_3SO_3Li$, etc.

Embodiment 1

First, a cathode pellet is made up as follows.

A cathode active material ($LiCoO_2$) is obtained by mixing lithium carbonate of 0.5 mol and cobalt carbonate of 1 mol to burn a mixture thereof for 5 hours in air at 900° C. Graphite of 12% by weight as a conductive agent and polytetra fluoroethylene powder of 3% by weight as a binder are uniformly mixed into the $LiCoO_2$ of 85% by weight thus obtained to carry out preliminary molding. By filling aluminum powder (mean particle diameter 45 μm) of 0.03 g in weight on the preliminarily molded cathode pellet to compression-mold it to form an aluminum layer as a collector. Thus, a cathode pellet having an outside diameter of 15.3 mm, a height of 1.08 mm, and a weight of 0.685 g was made up.

Then, an anode pellet was made up as follows.

An anode active material is obtained by adding polyvinylidene fluoride of 10% by weight as a binder to pitch coke of 90% by weight to uniformly mix them to add N-methyl-2-pyrolidone as a dispersant to the mixture to compression-mold it. By filling copper powder (mean particle diameter 45μ) of 0.03 g in weight on the preliminarily molded anode pellet to compression-mold it, a copper layer serving as a collector is formed. Thus, an anode pellet having an outside diameter of 15.6 mm, a height of 0.83 mm and a weight of 0.222 g was made up.

This anode pellet is inserted into a cylindrical anode ring having an outside diameter of 15.8 mm, an inside diameter of 15.6 mm, and a height of 0.73 mm spot-welded in advance on the anode can in a manner to oppose the copper layer to put or place a microporous film separator thereon to place a sealing gasket of plastic through the separator on the upper portion thereof to drop an electrolytic solution from an upper direction.

Further, the previously described cathode pellet is mounted thereon so that the aluminum layer is not on the separator side to cover thereon a cathode packaging can comprised of three layers of aluminum, stainless and nickel to caulk its end to seal it, thus to prepare a coin-type non-aqueous electrolyte secondary battery having an outside diameter of 20 mm, and a height of 2.8 mm.

It is to be noted that an organic electrolytic solution in which $LiPF_6$ is dissolved at the rate of 1 mol/1 into a solvent obtained by mixing propylene carbonate and diethyl carbonate at the rate of 1:1 in terms of volume ratio is used as an electrolytic solution.

COMPARATIVE EXAMPLE 1

A coin-type non-aqueous electrolyte secondary battery (comparative example battery) was made up in the same manner as in the above-described embodiment 1 except that no aluminum layer is formed on the cathode pellet and no copper layer is formed on the anode pellet, and that conductive coating (e.g., coating by Nippon Azison Company: Trade Name; Conductive Coating Electroduc 114) is coated on the cathode can by the same area as that of the cathode pellet and in a manner in contact therewith.

In connection with the embodiment battery and the comparative example battery thus prepared, a charge/discharge cycle test to charge these batteries for 30 hours under the condition of a current of 4.7 mA and an upper voltage of 4.0 V to subsequently discharge them under the condition of 2.2 mA was conducted.

Figure 2:
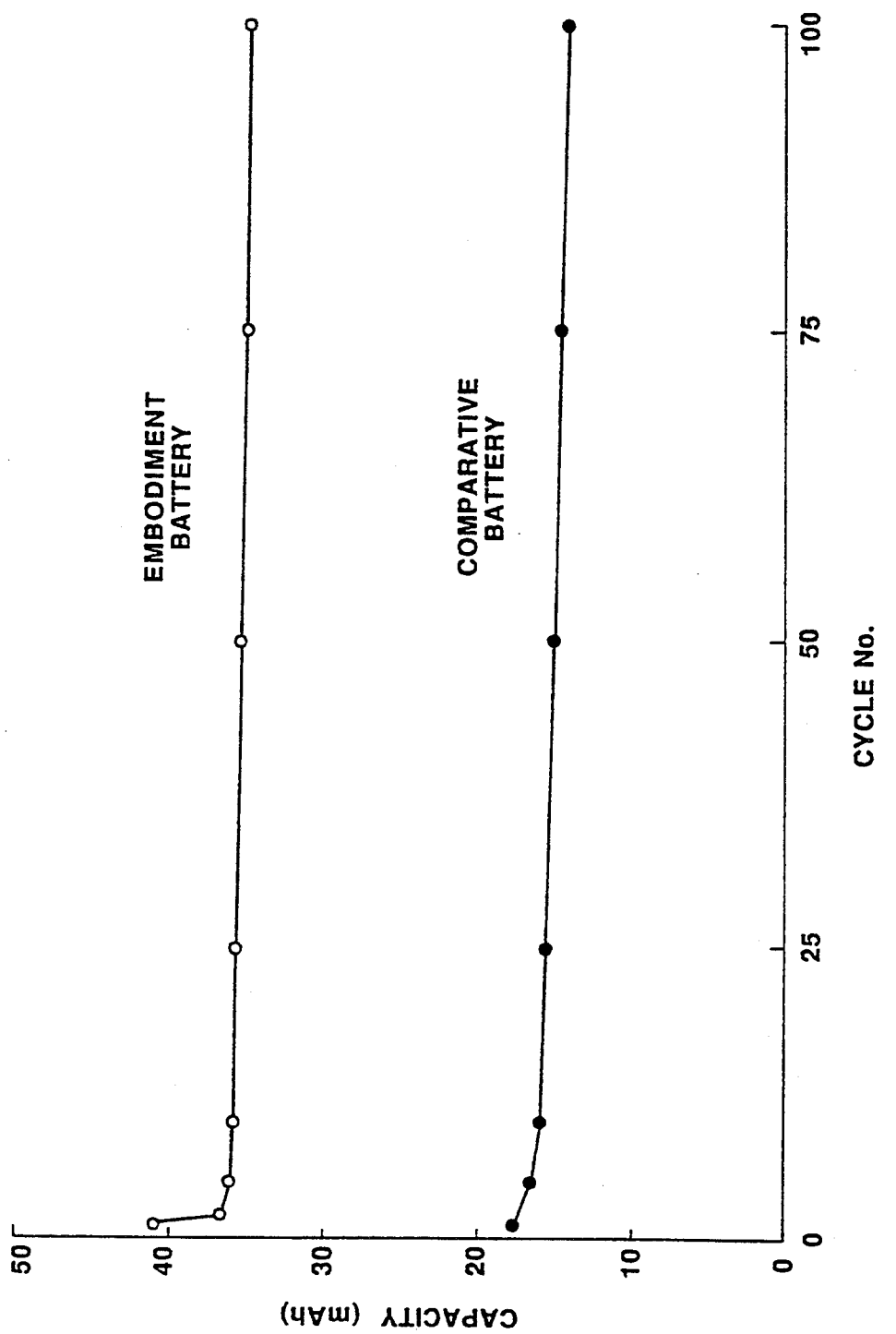
FIG. 2 is a characteristic diagram showing a charge/discharge cycle characteristic of the coin-type non-aqueous electrolyte secondary battery.

Measured results of discharge capacity at the time of respective cycles are shown in FIG. 2.

It is seen from FIG. 2 that, in the case of the embodiment battery, a discharge capacity greater about two times or more than that of the comparative example battery is provided, and there results a less discharge capacity degradation in the charge/discharge cycle.

Accordingly, it was indicated from the above fact it is effective for allowing the charge/discharge cycle characteristic to be satisfactory to respectively form layers containing conductive powder as a collector on the cathode pellet and the anode pellet.

Then, a withstand voltage test to apply a voltage continuously for ten days at 60° C. at a charge voltage of 4.0 V was conducted in connection with the embodiment battery and the comparative example battery.

The battery internal resistance value and the discharge capacity when the both batteries are discharged to a final voltage of 2.5 V at 1.2 mA before the test and after the test were shown in the Table 1.

TABLE 1

|  | BEFORE TEST | | AFTER TEST | |
| --- | --- | --- | --- | --- |
|  | INTENAL RESISTANCE ($\Omega$) | DISCHARGE CAPACITANCE | INTERNAL RESISTANCE ($\Omega$) | DISCHARGE CAPACITANCE |
| EMBODIMENT BATTERY | 4.2 | 41.6 | 5.0 | 38.1 |
| COMPARATIVE BATTERY | 4.8 | 16.3 | 22.3 | 13.2 |

As shown in the Table 1, in the case of the embodiment battery 1 in which metal powder as a collector is integrally molded with the cathode and anode pellets, even after a voltage is continuously applied for 10 days at 60° C., rise in the battery internal resistance is extremely small, and a discharge capacity of 91.6% is also maintained. On the contrary, in the case of the comparative example battery, the battery internal resistance rises up to a value about four times or more than that before the test, so the discharge capacity is lowered to 81.0%. From this fact, the effect of the layers containing powder having conductive property formed on the cathode pellet and the anode pellet was made more clear.

What is claimed is:

1. A non-aqueous electrolyte secondary battery comprising:

a first electrode, comprising a cathode can and a molded cathode pellet with a first conductive powder-layer in contact with said cathode can, said first conductive powder-layer being compression-molded with a cathode active material;

a second electrode, comprising an anode can and a molded anode pellet with a second conductive powder-layer in contact with said anode can, said second conductive powder-layer being compression-molded with an anode active material; and separator means, disposed between said first electrode and said second electrode, for separating said first electrode from the said second electrode.

2. A non-aqueous electrolyte secondary battery as claimed in claim 1, wherein the first conductive powder layer is a layer of aluminum powder.

3. A non-aqueous electrolyte secondary battery as claimed in claim 1, wherein the second conductive powder layer is a layer of copper powder.

* * * * *